United States Patent [19]

Hanscom et al.

[11] Patent Number: 4,672,659
[45] Date of Patent: Jun. 9, 1987

[54] SINGLE TAPE AUTOMATIC TELEPHONE ANSWERING MACHINE

[75] Inventors: Bradford E. Hanscom, Downey; Raymond G. Bond, Long Beach, both of Calif.

[73] Assignee: Fortel Corporation, Compton, Calif.

[21] Appl. No.: 808,993

[22] Filed: Dec. 16, 1985

[51] Int. Cl.$^4$ .......................... H04M 1/64; H04M 1/65
[52] U.S. Cl. ...................................... 379/79; 360/72.2
[58] Field of Search .................... 179/6.03, 6.04, 6.07, 179/6.09, 6.11, 6.13; 379/70, 71, 74, 77, 75, 79; 360/72.2, 74.4; 369/24, 25

[56] References Cited

U.S. PATENT DOCUMENTS

| | | | |
|---|---|---|---|
| 4,210,785 | 7/1980 | Huber et al. | 360/72.2 |
| 4,309,571 | 1/1982 | Chamberlin | 179/6.09 |
| 4,421,954 | 12/1983 | Mita et al. | 179/6.13 |
| 4,436,959 | 3/1984 | Nakatsuyama et al. | 179/6.11 |
| 4,517,410 | 5/1985 | Williams et al. | 179/6.04 |

Primary Examiner—Raymond F. Cardillo
Assistant Examiner—James E. Tomassini
Attorney, Agent, or Firm—Keith D. Beecher

[57] ABSTRACT

An automatic microcomputer controlled telephone answering machine which uses a single magnetic tape for both the outgoing message (OGM) and the incoming messages (ICM). The OGM is pre-recorded on the tape near the origin position of the tape. Then, whenever an incoming telephone call is received, the machine is first set to a playback mode and the OGM is sent to the calling party over the telephone line. The tape is then advanced at high speed past any previously recorded ICM's to the first vacant location on the tape. The ICM from the caller is then recorded at that location. When the call is completed, the machine rewinds the tape back to the origin position and awaits the next call. The tape includes a data section at the origin position which precedes the start of the OGM. This section contains recorded binary coded data which is sensed and fed to the microcomputer, and which enables the microcomputer to determine, inter alia, the location of the end of the OGM section on the tape, and the location of the end of the last ICM previously recorded on the tape. This enables the microcomputer appropriately to control the machine.

3 Claims, 4 Drawing Figures

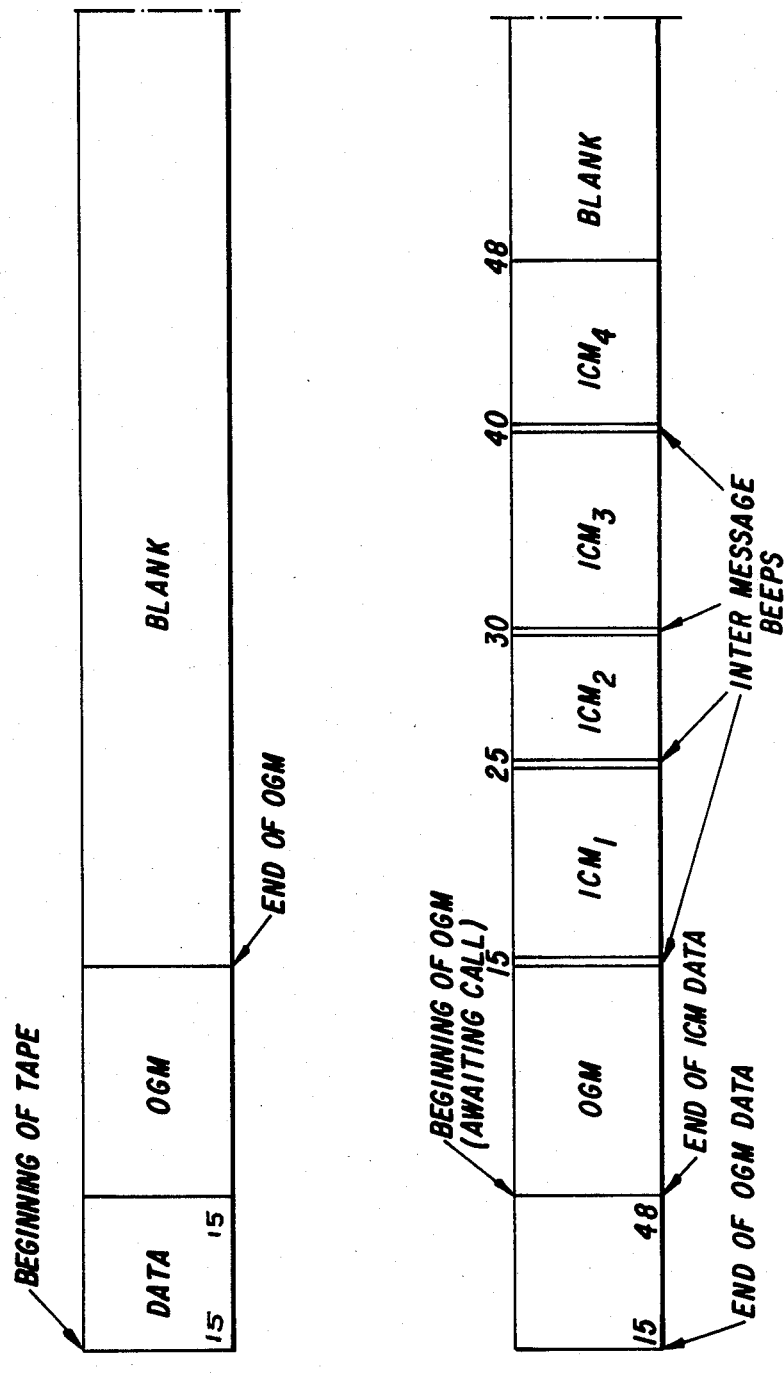

SINGLE TAPE AUTOMATIC TELEPHONE ANSWERING MACHINE

BACKGROUND OF THE INVENTION

The usual present-day telephone answering machine includes a first magnetic tape mechanism which drives a first magnetic tape on which an outgoing message (OGM) is pre-recorded, and a separate magnetic tape mechanism which drives a second magnetic tape on which the incoming messages (ICM) received from calling parties are recorded.

When a telephone call is received, the conventional telephone answering machine answers the telephone and causes the pre-recorded announcement message (OGM) on the first magnetic tape to be transmitted over the telephone line to the calling party. At the end of the OGM, the conventional machine automatically enters a recording mode, and the incoming message (ICM) from the calling party is recorded on the second magnetic tape. The second magnetic tape mechanism in the conventional machine is controlled so that all the messages received from the calling parties are successively recorded on the second magnetic tape.

Attempts have been made in the past to simplify the telephone answering machine by using a single tape driven by a single tape drive mechanism on which both the OGM and the ICM's are recorded. Such a machine is described, for example, in U.S. Pat. Nos. 4,309,571 and 4,421,954.

The telephone answering machine described in the patents includes, for example, a magnetic tape mechanism having a stop mode, a rewind mode, a playback mode, and a fast-forward mode. The automatic telephone answering machine operates by automatically coupling the magnetic tape mechanism to an associated telephone line upon the detection of a ring signal on the telephone line; and by setting the magnetic tape mechanism to its playback mode so that a pre-recorded OGM recorded on the magnetic tape may be transmitted over the telephone line to the calling party. At the completion of the OGM, and if no previous ICM's have been recorded, the mechanism then records the ICM from the calling party at a location directly following the OGM. If there have been previously recorded ICM's, the mechanism is set to its fast-forward mode until the tape is driven to a location beyond the last previously recorded ICM, and the mechanism is then set to its recording mode so that the ICM from the calling party may be recorded at that location. At the end of each ICM, the magnetic tape mechanism is set to its rewind mode, and when the tape has been rewound to a point corresponding to the beginning of the recorded OGM, the mechanism is set to its stop mode, thereby conditioning the machine to answer the call from any subsequent calling party and to repeat the cycle described above.

An objective of the present invention is to provide a simple microcomputer controlled telephone answering machine in which the controls described in the preceding paragraph may be effectuated in a simple and uncomplicated manner and by a minimum of control circuitry.

BRIEF DESCRIPTION OF THE DRAWINGS

FIG. 3 is a schematic representation of the recordings on the single tape of the machine prior to the recording of any incoming messages; and FIG. 4 is a schematic representation of the recordings on the single tape, after a series of incoming messages have been received.

DETAILED DESCRIPTION OF THE ILLUSTRATED EMBODIMENT

Figure 1:
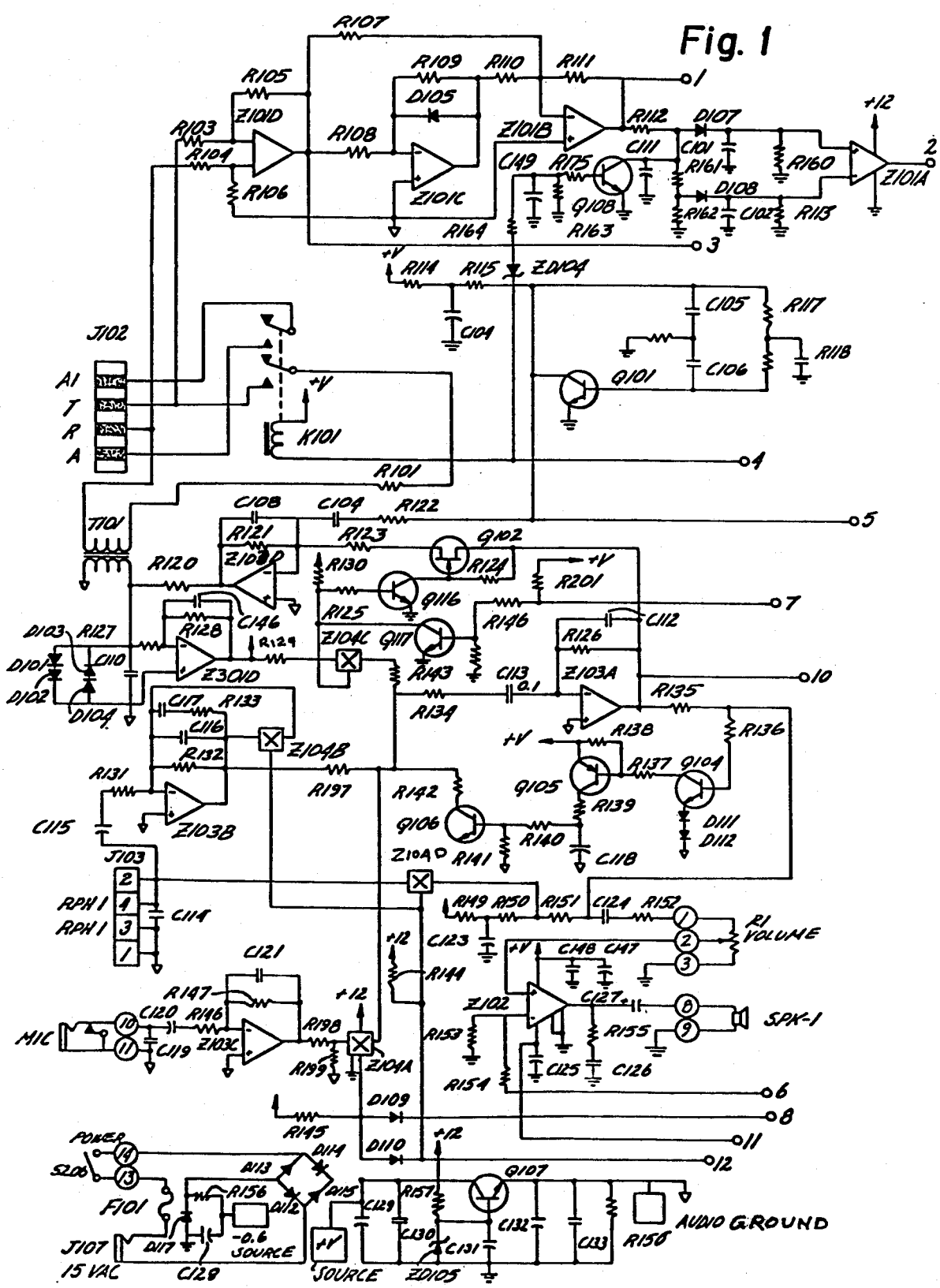
FIGS. 1 and 2 together form a schematic diagram of a circuit appropriate for effectuating the desired controls of the single tape telephone answering machine of the invention.
Figure 2:
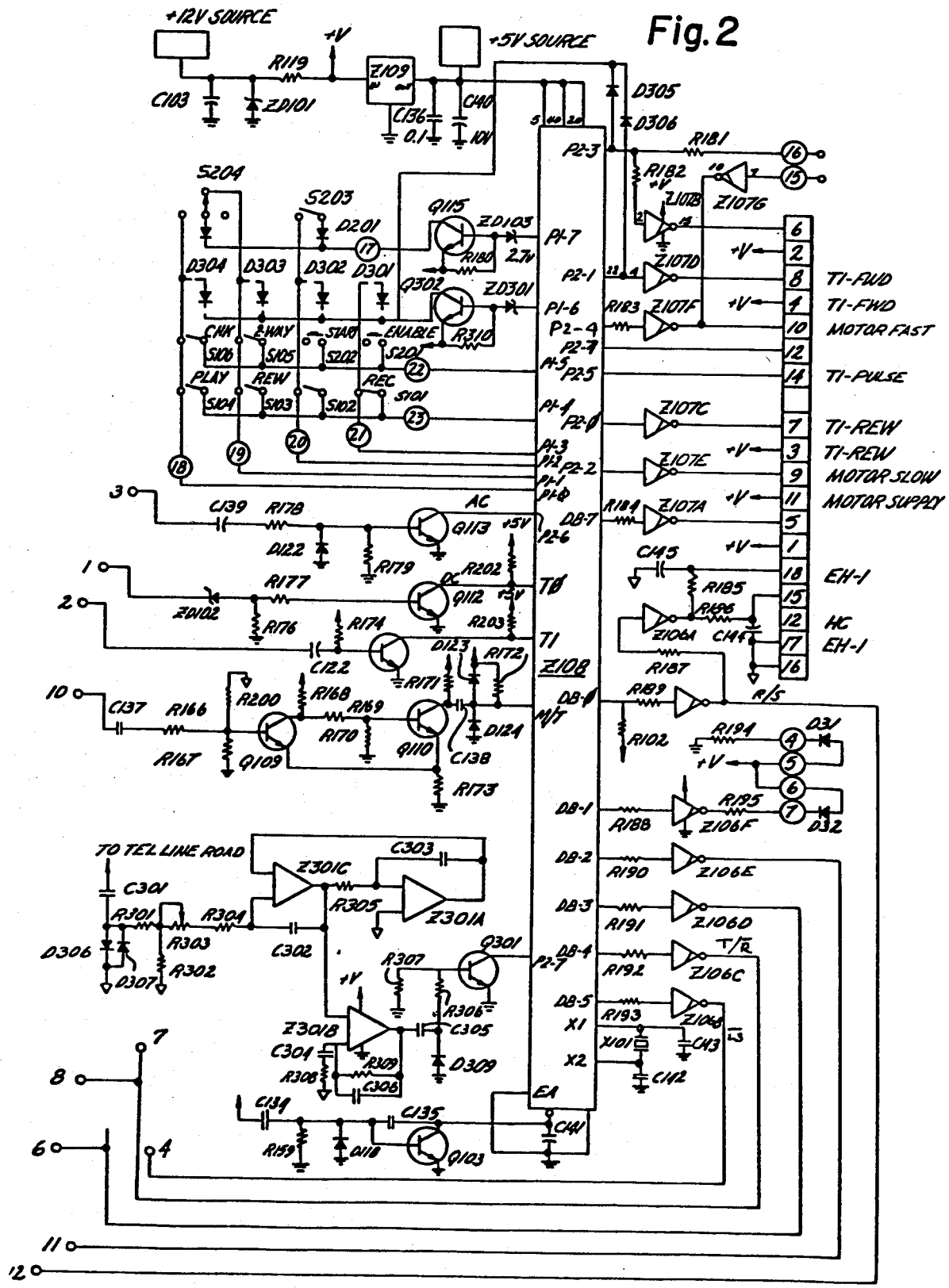

The circuit of FIGS. 1 and 2 includes a microcomputer Z108 which may be of the type manufactured and sold by the National Semiconductor Company, and which is designated by them as INS8048. The circuit also includes a connector J102 which is connected to the tip and ring terminals of a telephone line. Line seizure is effectuated by a relay K101. The circuit is coupled to the telephone line through a transformer T101.

The audio signals corresponding to the outgoing announcement message (OGM) transmitted by the system during an announcement interval ($T_1$) are amplified by an amplifier Z103B The audio signals corresponding to the incoming messages (ICM's) to be recorded during a message interval ($T_2$) are amplified by an amplifier Z103A. A connector J103 is connected to a record and reproduce head RPH1 associated with the single tape on which the OGM and the ICM's are recorded.

As shown in FIG. 3, the single tape incorporated into the machine includes a pre-recorded OGM located near the beginning of the tape. An additional area designated DATA in FIG. 3 is provided between the OGM and the beginning of the tape. The remainder of the tape, following the end of the OGM is initially blank, as shown in FIG. 3.

As shown in FIG. 4, the data portion of the tape includes a first binary coded number, illustrated by way of example as "15", which designates the location on the tape corresponding to the end of the OGM. The data section also includes a second binary coded number which, in FIG. 4, is shown by way of example as "48", which designates the location on the tape at which the next blank portion following previously recorded ICM's occurs, and at which the next ICM may be recorded.

When the machine is first used, the number in the data portion indicating the location at which the next ICM may be recorded is "15", for example, corresponding to the end of the OGM. Then, when the machine first answers the telephone, the OGM is first played over the telephone line to the caller, and a beep at the end of the OGM indicates to the caller that he can now begin recording his message. Accordingly, the first incoming message, designated ICM1, is recorded, for example, from location 15 to location 25. At the end of each incoming message, a beep tone is recorded on the tape.

The tape then is rewound to its origin position, and the machine awaits the next call. When the next call is received, the number designating the location for the next ICM recording is "25". Accordingly, the machine automatically plays the OGM over the telephone line, and then moves the tape at fast-forward speed through the first message ICM1 while outputting a tone to the caller until it reaches location 25, at which time the tone stops informing the caller that he can record his message, which is designated ICM2. In this way, successive message are recorded on the single tape, for example, at locations 30 and 40.

In the condition shown in FIG. 4, the next blank location is "48", as shown in the DATA portion so that the tape will rapidly move to location 48 while outputting a tone, after the OGM has been played. When "48" is reached, the tone will cease, informing the caller that he can now record his message.

Referring again to FIGS. 1 and 2, the incoming audio signals representing the ICM's are passed through transformer T101 and through a bilateral analog switch Z104C to amplifier Z103A, and through a bilateral analog switch Z104D to the record/reproduce head RPH1 to be recorded on the tape, in the manner shown in FIG. 4. Resistors R149, R150 and R151, together with grounded capacitor C123 provide a bias circuit for the head. An automatic gain control circuit for amplifier Z103A is provided by transistors 0104, Q105 and Q106.

The OGM which was pre-recorded on the tape is amplified by amplifier Z103B, and is translated through amplifier Z103A and amplifier Z103D to transformer T101 for application to the telephone line.

The ring signal for the telephone answering machine is initiated when a ring signal on the telephone line occurs at the tip (T) and ring (R) terminals of connector J102. The ring signal is fed to an operational amplifier Z101D. The alternating current output of amplifier Z101D is fed to port P2-6 of microcomputer Z108 (FIG. 2), by way of a differentiator circuit formed by capacitor C139, resistor R178, diode D122, resistor R179 and transistor Q113.

The microcomputer Z108 decides whether or not the alternating current output of amplifier Z101D is of proper duration (>400 milliseconds) and proper frequency (16–68 Hz), and if so, and the user set number has been reached, activates the magnetic tape mechanism which causes the telephone answering machine to go off-hook, and the OGM to be played over the telephone line to the caller. For this purpose, microcomputer Z108 activates port P2-2 which turns on a motor (M1) at its regulated speed by way of a driver Z107E, and terminal J105-9. Port P2-1 of the microcomputer is also turned on at this time to activate a T1 forward solenoid. This causes the tape to move forward at play speed, so that the OGM may be transmitted over the telephone line to the caller. At the same time, port DB-5 of the microcomputer Z108 goes high (1), and its output is fed to an inverting amplifier driver Z106B whose output $\overline{LS}$ is at ground potential. This activates relay K101, which puts transformer T101 and resistor R101 across the tip and ring terminals of connector J102, providing a line seize (off-hook) condition. Port DB-4 of the microcomputer is low (0) at this time, and its output is inverted by inverter Z106C providing high (1) potential at its output (T/$\overline{R}$). This potential is fed to the base of transistor 0117 (FIG. 1) to render that transistor conductive. When transistor 0117 is conductive, it causes the bistable analog switch Z104C to be biased off by way of resistor R130.

Audio signals corresponding to the OGM recorded on the moving tape are picked up by head RPH1 and fed by way of capacitor C115 and resistor R131 to amplifier Z103B. The audio signals are amplified by a gain of approximately 200, and fed to amplifier Z103A by way of resistors R197 and R134, and capacitor C113. The OGM audio signals are amplified in amplifier Z103A by a gain of approximately 100, and are fed to field-effect transistor (FET) Q102 which is biased to its conductive state by resistor R124. So long as transistor 0116 is non-conductive, the OGM signals are passed through FET Q102 to amplifier Z103D, from which they are fed to the line transformer T101. The line transformer transmits the OGM signals to the telephone line.

The message recording cycle ($T_2$) begins when the location designated by the end of OGM data in the DATA section of the tape is rebognized by the microcomputer Z108. The microcomputer then causes its port P2-4 to go high, causing driver Z107F to cause the motor driving the tape to move at high speed until the next location on the tape, as designated by the "end of ICM" data in the DATA portion is reached. When the location on the tape is reached, as designated by the "end of ICM" data, at which the next message is to be recorded, the port P2-2 goes high and the port P2-4 goes low so that the motor will proceed at slow recording speed enabling the next ICM to be recorded in the appropriate location on the tape.

The ICM audio signals from the telephone line are fed into the system when microcomputer Z108 causes port DB-4 to go high (1), the output being inverted by inverter Z106C causing its output T/$\overline{R}$ to go low (0). When T/$\overline{R}$ goes low, Q117 becomes non-conductive to allow voltage from resistor R130 to turn on analog switch Z104C. When switch Z104C is turned on, it permits the ICM audio signals from the telephone line to be passed to amplifier Z103A by way of T101, R127, R129, Z104C, R143, R134 and C113. Amplifier Z103 feeds audio signals to the head RPH1 of the tape by way of resistors R135 and R151, analog switch Z104D and connector J103. Resistors R149 and R150, and capacitor C123 provide a DC bias to RPH-1. Analog switch Z104D is turned on at this time by the microcomputer Z108 causing port DB-0 to go low (0), and output R/$\overline{P}$ to go high (1) so that the audio may be applied to the heads RPH1. The amplifier Z103B is disabled at this time because analog switch Z104B is also turned on. At the end of an ICM message recording interval, port P2-1 goes low releasing the forward solenoid. Port P2-0 will then go high (1) activating the T-1 rewind solenoid, which causes the tape to rewind to its origin position. When that position is reached, no more T1 pulses are received at port P2-5, and the microcomputer terminates the rewind operation and sets the system in condition to receive the next call. In this manner, successive ICM's are recorded on the tape.

In order to retrieve his messages, the user closes the "PLAY" switch. This causes port P2-1 to go high (1) to activate the T-1 forward solenoid, and causes P2-4 to go high (1) enabling motor fast forward until the tape has reached the end of the OGM. When that point on the tape is reached, P2-4 will be made low (0) causing the tape to be played back at normal speed.

Audio information is now fed from the T-1 record/reproduce head RPH2 through J103 to pre amplifier Z103B, and then to amplifier Z103A by way of resistor R197, resistor R134 and capacitor C113. Amplifier Z103A feeds the audio information from the tape through amplifier Z102 to speaker SPK-1. The ICM's recorded on the tape are then reproduced by the speaker at a volume established by the setting of potentiometer R1.

After all the ICM's recorded on the tape have been reproduced by the speaker, microcomputer Z108 senses the fact that the tape has moved to the end of the last ICM, and stops the tape. The microcomputer will then rewind the tape by causing port P2-1 to go low (0) and P2-0 to go high, and the tape is rewound back to its origin position. The machine is again ready to answer any subsequent calls received over the telephone line.

When the system described above is used in an answering machine with remote control capability, it functions as follows:

When a call is received, the machine answers after a predetermined number of rings, plays the OGM to the caller, and then applies a continuous beep tone while fast-forwarding to the last recorded "end of ICM" location. At that point, the machine switches to normal record mode and records the ICM. If a valid remote code is received at this time, the unit will rewind the tape to the "end of OGM" and begin playback of the messages. After playback is complete, the user may have the option of repeating the playback again, or resetting the "end of ICM" data in the data portion of the tape back to the "end of OGM".

When the system is used with a single button type of control, such as described in copending application Ser. No. 527,978 filed Aug. 31, 1983 in the name of Raymond G. Bond, it functions as follows:

When the user presses the single button, the unit will fast-forward to the "end of OGM" and begin playback. At the end of playback the unit rewinds to the beginning of the tape. If the owner presses the button again, the playback process repeats and again returns to the origin position of the tape. If the user holds the button for 3 seconds, for example, the tape repositions to the beginning of the OGM and stops. Since the old "end of ICM" data is preserved, operation will continue as though the user had not touched the machine.

If after message playback the button is not pressed or held, the tape will stay at the "beginning of tape" origin position until the telephone rings. At this time, the machine sets the "end of ICM" data equal to the "end of OGM" data (no messages received) and repositions to the "beginning of OGM". The machine will then answer after a predetermined number of rings and proceed as above.

The user can also replace the pre recorded OGM by rerecording his own personal announcement of any desired length. After the new OGM is recorded, the new "end of OGM" data plus the old "end of ICM" data will be recorded in the DATA section at the beginning of the tape, and the tape will be positioned at the "beginning of OGM".

The user may also install his own blank tape, and create his own OGM of any desired length. As before, the machine will rewind to the beginning of the tape at the conclusion of recording the OGM and will record the "end of OGM" data and the "end of ICM" data.

It will be appreciated that while particular embodiments of the invention have been shown and described, modifications may be made. It is intended in the claims to cover all modifications which come within the true spirit and scope of the invention.

We claim:

1. An automatic telephone answering machine in which an outgoing message is recorded at a predetermined location in a track on a magnetic medium to be played back to calling parties, and in which incoming messages from such calling parties are recorded in sequence in the same track on said medium, said track having a data portion in which first data is recorded designating the location on said medium corresponding to the end of said outgoing message, and in which second data is recorded designating the location on said medium corresponding to the end of the last incoming message previously recorded on said medium; drive means for moving said medium and capable of being set to a slow forward mode, a fast forward mode, a rewind mode and a stop mode; transducer means coupled to said medium for recording signals in said track on said medium and for reproducing previously recorded signals therefrom; means for detecting an incoming telephone call and for automatically connecting the machine to the telephone line on which the incoming call is detected; and control means connected to said transducer means and to said drive means and responsive to a signal from said detecting means indicating the receipt of an incoming call, to move said medium relative to said transducer means in said slow forward mode to enable the outgoing message recorded on said medium to be sent to the calling party, responding to the first data on the medium for moving said medium in said fast-forward mode at the end of the recorded outgoing message to move said transducing means past previously recorded incoming messages, and responsive to said second data on said medium for moving said medium in said slow forward mode after the last previously recorded incoming message has been passed by said transducer means for moving said medium in said slow forward mode to enable the incoming message from the last calling party to be recorded on said medium and afterwards said control means up-dates said second data at the end of the recording of the last incoming message, so that said second data indicates the location on said medium corresponding to the end of said last recorded incoming message.

2. The automatic telephone answering machine defined in claim 1, in which said control means sets said drive means to said stop mode at the end of the recording of the last incoming message.

3. The automatic telephone answering machine defined in claim 2, in which said control means subsequently sets said drive means to said rewind mode after the recording of said last incoming message, so as to return said magnetic medium to an origin position in condition to play back the outgoing message to the next calling party upon the receipt of the next telephone call on the telephone line.

* * * * *